A. M. WEBB.
LIQUID AND GAS CONTACT APPARATUS.
APPLICATION FILED JUNE 19, 1918.

1,293,270.

Patented Feb. 4, 1919.

Inventor
Adolphus M. Webb
By
Attorney

UNITED STATES PATENT OFFICE.

ADOLPHUS M. WEBB, OF CHARLOTTE, NORTH CAROLINA.

LIQUID AND GAS CONTACT APPARATUS.

1,293,270.  Specification of Letters Patent.  Patented Feb. 4, 1919.

Application filed June 19, 1918. Serial No. 240,736.

*To all whom it may concern:*

Be it known that I, ADOLPHUS M. WEBB, citizen of the United States, residing at Charlotte, in the county of Mecklenburg and State of North Carolina, have invented certain new and useful Improvements in Liquid and Gas Contact Apparatus, of which the following is a specification.

This invention relates to improvements in apparatus for effecting an intimate contact or mixture of vapors or gases with liquids, and is particularly designed for use in the manufacture and concentration of sulfuric, nitric, muriatic and other acids, although adapted for other uses, such as absorption or cooling of gases or liquids.

In the treatment of sulfuric, nitric or other acids, the weak acid is ordinarily caused to flow downwardly in a tower through which cold air, acid gases or combustion gases are caused to flow upwardly, the tower being packed with a body of checkered work or the like, and the present invention relates particularly to new and improved packing units for filling the tower, these units being in the form of rings or tubes of special construction wherein the gas and liquid are caused to travel a prolonged distance in contact with each other. The rings or tubes are particularly characterized by a construction by means of which the fluids are caused to flow over a large surface in opposed helical directions, for which purpose each unit is provided with a helical flange.

This construction produces an intensive mixing motion of the liquid and gases and greatly increases the length of travel of the contacting liquid and gases as compared with total height of the column or tower, whereby said height can be greatly decreased as compared with towers filled with checkered brick, broken quartz, coke or the like. The construction gives a large contact surface for each cubic unit of space, and also provides relatively large free spaces for the passage of the liquid and gases, so that not only is the effectiveness of the action increased, but the time required is decreased, by the relatively large volume of flow. The packing or filling also has an advantage in that it is self-supporting, being built up in layers one upon the other, without any tendency to bulge outwardly or exert pressure on the side walls of the tower, and the material of which the packing rings is constructed is preferably earthenware so that they can be cheaply produced. Other advantages will be apparent from the following description.

Figure 1:
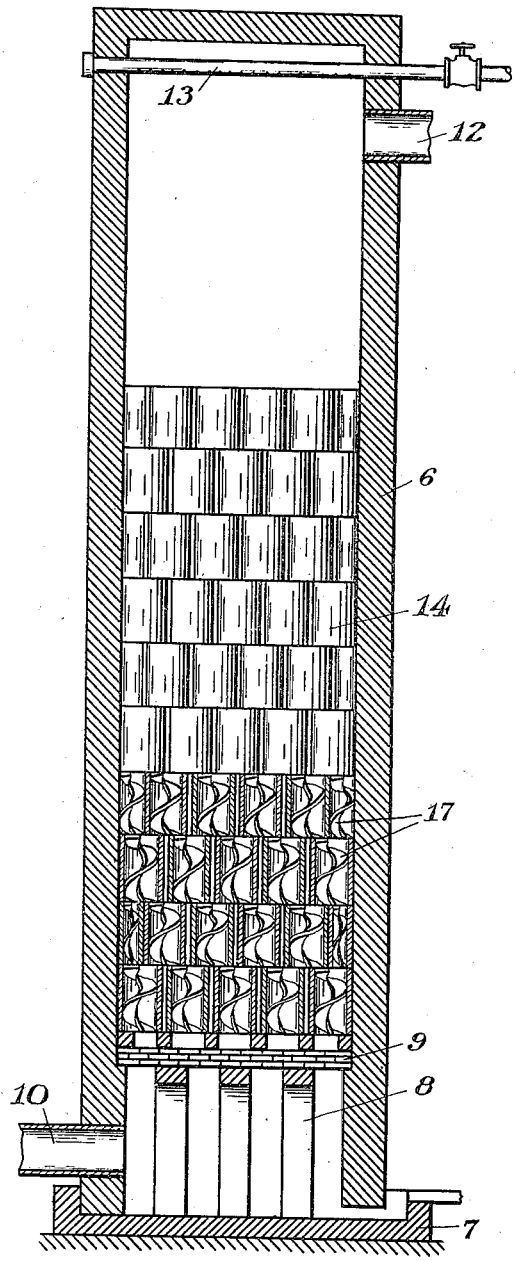
Figure 2:
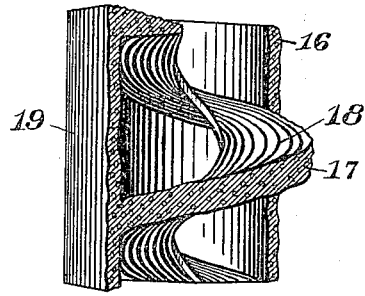
Figure 3:
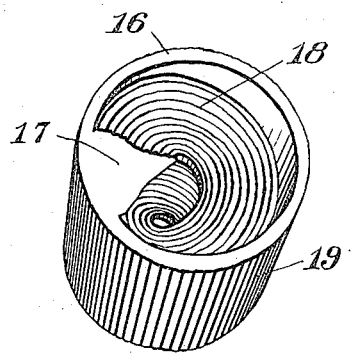

In the accompanying drawings, Figure 1 is a vertical section of a tower provided with the improved packing rings. Fig. 2 is a perspective of one of the rings, partly broken away to show the helical rib or flange. Fig. 3 is a perspective of one of the rings.

In the drawings, 6 indicates the tower which may be of any suitable construction, preferably made of chemical brick or tile rising from the base 7 which forms a collecting pan or chamber for the concentrated liquid. Arches 8 and checkered work 9 are provided in the bottom of the tower for supporting the filling above. 10 is an inlet to the bottom chamber for gas, 12 is an outlet at the top for gas and 13 is a spray pipe at the top for the weak acid or other liquid.

The filling consists of a succession of rows of rings or tubes indicated at a whole at 14, and packed one upon the other in horizontal layers within the tower. The rings of the successive layers are so arranged that they break joints with each other, as clearly shown in Fig. 1, and thereby the upflowing air or gas and the down-flowing liquid follow tortuous courses through the successive layers, said courses consisting of a plurality of helical columns of air or gas, and a plurality of helical streams of liquid moving in opposite directions. In other words, the air or gas is carried upwardly in a plurality of individual helical courses and the liquid flows downwardly in a corresponding plurality of helical streams or courses in the opposite direction, and these streams twist together (so to speak) in contact, whereby a high efficiency is attained.

The individual rings are shown particularly in Figs. 2 and 3, and each consists of an outer tube or cylinder 16 within which is a helical flange or vane 17 which extends lengthwise from one end of the cylinder to the other. These parts are preferably molded or formed of earthenware, in a single piece, and fired in that shape. They may be formed of other acid-resisting material, but if made of earthenware, they are cheaply constructed, self-supporting and do not require special work in uniting the parts.

To increase the available area of surface exposure, the upper side of the helical rib or flange, down which the liquid flows, is grooved or corrugated lengthwise, as shown at 18, and, also, the exterior of the tube is grooved or corrugated as indicated at 19. It is preferred that the helical flange be located inside of the cylinder. The flange is thereby protected against breakage and assists in supporting or strengthening the outer wall or cylinder. When such units are assembled in horizontal layers and in staggered relation in a tower, vertical spaces are produced between the various units, each space being partly obstructed by the rings of the adjacent layers and through each ring or tube helical passages exist. When gas or air is forced up through the tower containing this filling, it travels in a large number of helical courses from the bottom to the top and in contact with the liquid which flows in reverse courses down the exposed surfaces of the rings, the liquid especially filling the grooves in the upper faces of the helices and dripping from the upper to the lower layers, and such liquid as drips over the inner edges of the flanges is exposed to the ascending and crosswise columns of air. The gas and liquid are thus brought into intimate relation and mixture with each other, both with respect to surface contact in the helical courses and with respect to cross contact in passing from one layer to the next. Thereby large absorption effect is produced and the general result with respect to time of operation and degree of concentration is superior to other appliances.

I claim:

1. A filler unit for gas and liquid contact towers, comprising a cylinder having a helical flange projecting from the inner wall thereof, said flange being of less width than the radius of the cylinder, whereby a continuous central opening is formed extending lengthwise through the cylinder.

2. A filler unit for gas and liquid contact towers, comprising a cylinder having a single continuous inner helical flange of relatively low pitch projecting from the wall thereof and forming a complete helix extending from one end to the other of the cylinder, the flange being of less width than the radius of the cylinder and forming a helical passage between the convolutions of the helix and a clear axial passage extending through the cylinder.

3. A filler unit for the purpose described comprising a cylinder of ceramic material having an internal continuous helicoid flange, whose inner edge is free.

4. A filler unit for the purpose described comprising a ceramic cylinder having an integral internal helicoid flange whose inner edge is free and whose upper surface is longitudinally grooved.

In testimony whereof, I affix my signature in presence of two witnesses.

ADOLPHUS M. WEBB.

Witnesses:
H. G. MARSHALL,
M. M. CRANDALL.